(12) United States Patent
Kim et al.

(10) Patent No.: US 12,184,487 B2
(45) Date of Patent: Dec. 31, 2024

(54) SERVERLESS COMPUTING METHOD AND APPARATUS BASED ON MUTUAL MONITORING BETWEEN NETWORK EDGES

(71) Applicant: FOUNDATION OF SOONGSIL UNIVERSITY-INDUSTRY COOPERATION, Seoul (KR)

(72) Inventors: Young Han Kim, Seoul (KR); Jae Eun Cho, Seoul (KR)

(73) Assignee: FOUNDATION OF SOONGSIL UNIVERSITY-INDUSTRY COOPERATION, Seoul (KR)

(*) Notice: Subject to any disclaimer, the term of this patent is extended or adjusted under 35 U.S.C. 154(b) by 0 days.

(21) Appl. No.: 18/011,690

(22) PCT Filed: Feb. 24, 2022

(86) PCT No.: PCT/KR2022/002717
§ 371 (c)(1),
(2) Date: Dec. 20, 2022

(87) PCT Pub. No.: WO2023/120813
PCT Pub. Date: Jun. 29, 2023

(65) Prior Publication Data
US 2024/0243969 A1 Jul. 18, 2024

(30) Foreign Application Priority Data
Dec. 24, 2021 (KR) .......................... 10-2021-0187073
Jan. 13, 2022 (KR) .......................... 10-2022-0004957

(51) Int. Cl.
*H04L 41/0816* (2022.01)

(52) U.S. Cl.
CPC .............................. *H04L 41/0816* (2013.01)

(58) Field of Classification Search
None
See application file for complete search history.

(56) References Cited

U.S. PATENT DOCUMENTS 8,966,503 B1 * 2/2015 Dyer ....................... G06F 9/542
714/100
11,153,177 B1 * 10/2021 Hermoni ............. H04L 43/0876
(Continued)

OTHER PUBLICATIONS

Mohammad S. Aslanpour et al. "Serverless Edge Computing: Vision and Challenges." Feb. 2021.
(Continued)

*Primary Examiner* — Fadi Haj Said
(74) *Attorney, Agent, or Firm* — Stein IP LLC

(57) ABSTRACT

The present invention relates to a serverless computing method and apparatus, and more particularly, to a serverless computing method and apparatus using mutual monitoring between network edges. The serverless computing method according to one embodiment of the present invention comprises monitoring, by an event handler of the first network edge, an event occurring in the second network edge, generating, by an event generating module of the second network edge, an event response signal through filtering on the event in response to the event occurring, transmitting, by an event delivery module of the second network edge, the event response signal to the event handler of the first network edge, and scaling an application, by an auto-scaler, in the first network edge based on the event response signal.

4 Claims, 6 Drawing Sheets

(56) References Cited

U.S. PATENT DOCUMENTS

| | | | |
|---|---|---|---|
| 2005/0052994 A1* | 3/2005 | Lee .......................... | H04L 47/29 370/235 |
| 2010/0262717 A1* | 10/2010 | Critchley ............ | H04L 67/1065 709/251 |
| 2020/0366559 A1* | 11/2020 | Parvataneni ........ | H04L 41/0894 |

OTHER PUBLICATIONS

Priscilla Benedetti et al. "Experimental Analysis of the Application of Serverless Computing to IoT Platforms." Jan. 2021.

\* cited by examiner

SERVERLESS COMPUTING METHOD AND APPARATUS BASED ON MUTUAL MONITORING BETWEEN NETWORK EDGES

CROSS-REFERENCE TO RELATED APPLICATIONS

This application is a national stage of International Application No. PCT/KR2022/002717, filed Feb. 24, 2022, which claims the benefit of Korean Application No. 10-2021-0187073, filed Dec. 24, 2021, and Korean Application No. 10-2022-0004957, filed Jan. 13, 2022, in the Korean Intellectual Property Office, the disclosures of which are incorporated herein by reference.

TECHNICAL FIELD

The present invention relates to a serverless computing method and apparatus, and more particularly, to a serverless computing method and apparatus using mutual monitoring between network edges.

BACKGROUND ART

Multi-access Edge Computing (MEC) provides application developers and content providers with cloud computing capabilities and IT service environments of the network edge. It moves traffic and service computing from a centralized cloud to the network edge, thereby bringing it closer to the end user, and significantly reducing latency.

As such, the MEC system has advantages such as resolving privacy concerns due to the centralization of cloud computing and strengthening security by localizing data, but virtualization applications that can be driven are limited because it has relatively fewer resources than the central large-capacity data sensor.

FIG. 1 is a block diagram of a conventional MEC system.

Referring to the drawing, the conventional MEC system 10 is largely composed of an MEC host 11 and an MEC manager 12.

The MEC host 11 is composed of a virtual infrastructure and a multi-access edge platform (MEP), and the virtual infrastructure supports the execution of the application by providing computing, storage, and network resources for running the application, and the MEP provides an environment for discovering, using, and providing services, which are essential functions for operating the application.

The MEC manager 12 is composed of a host-level manager and a system-level manager. The host-level manager, MEPM (Multi-access Edge Platform Manager), manages the application lifecycle, traffic rules, DNS configuration, etc., and the system-level manager, MEO (Multi-access Edge Orchestrator), centrally maintains and manages the entire MEC system. In other words, the MEO is a high-level manager who can coordinate between multiple MEPMs.

On the other hand, since the MEC system has a centralized structure, it takes a long time to make a related decision when relocation of an application is necessary for reasons such as terminal movement.

FIG. 2 is a flowchart illustrating an application relocation process of a conventional MEC system.

Referring to the drawing, when the app or MEP makes a pre-relocation decision, the host-level management MEPM makes a final relocation decision (S20).

Thereafter, the MEPM sends a relocation request to the MEO (S21), and the MEO selects an MEC host based on conditions such as available services, resources, and latency among multiple MEC hosts, and then sends an application instantiation request to the MEPM of the selected MEC host (S22).

Finally, the MEP generates an application instance in the MEC host (S23).

As described above, since the conventional MEC system performs an application relocation process through MEO, it takes a considerable amount of time to process the relocation process. Therefore, when the mobility of the user terminal is high, there is a problem in that there is a possibility that the service execution fails while only relocation is attempted.

DISCLOSURE

Technical Problem

An object of the present invention is to provide a serverless computing method and apparatus capable of reducing application relocation time through communication between network edges without using a central control unit (MEO).

In addition, an object of the present invention is to provide a serverless computing method and apparatus capable of supplementing scarce resources at the network edge by operating a specific application only upon request.

The objects of the present invention are not limited to the objects mentioned above, and other objects and advantages of the present specification that are not mentioned may be understood by the following description, and will be more clearly understood by the embodiments of the present disclosure. Moreover, it will be readily apparent that the objects and advantages of the present invention may be realized by the means recited in the claims and combinations thereof.

Technical Solution

The serverless computing method according to one embodiment of the present invention comprises monitoring, by an event handler of the first network edge, an event occurring in the second network edge, generating, by an event generating module of the second network edge, an event response signal through filtering on the event in response to the event occurring, transmitting, by an event delivery module of the second network edge, the event response signal to the event handler of the first network edge, and scaling an application, by an auto-scaler, in the first network edge based on the event response signal.

Further, in one embodiment of the present invention, the second network edge detects an event occurring in each network edge through mutual monitoring with the first network edge.

Further, the serverless computing method according to one embodiment of the present invention further comprises, before transmitting the event response signal, identifying a resource of the second network edge and if a remaining resource of the second network edge is greater than or equal to a preset reference value, transmitting, by the event delivery module, the event response signal to the event handler of the second network edge.

The serverless computing method according to one embodiment of the present invention further comprises, before monitoring the event, grouping, by a multi-access edge orchestrator (MEO) that is a central control device for controlling the first network edge and the second network edge, a part of the first network edge according to a preset criterion.

A serverless computing apparatus according to one embodiment of the present invention comprises one or more processors for executing an instruction, wherein one or more processors perform steps comprising monitoring, by an event handler of the first network edge, an event occurring in the second network edge, generating, by an event generating module of the second network edge, an event response signal through filtering on the event in response to the event occurring, transmitting, by an event delivery module of the second network edge, the event response signal to the event handler of the first network edge, and scaling an application, by an auto-scaler, in the first network edge based on the event response signal.

Further, in one embodiment of the present invention, the second network edge detects an event occurring in each network edge through mutual monitoring with the first network edge.

Further, in the serverless computing apparatus according to one embodiment of the present invention, one or more processors further perform, before transmitting the event response signal, a step of identifying a resource of the second network edge and if a remaining resource of the second network edge is greater than or equal to a preset reference value, transmitting, by the event delivery module, the event response signal to the event handler of the second network edge.

Further, in the serverless computing apparatus according to one embodiment of the present invention, one or more processors further perform, before monitoring the event, a step of grouping, by a multi-access edge orchestrator (MEO) that is a central control device for controlling the first network edge and the second network edge, a part of the first network edge according to a preset criterion.

Advantageous Effects

The serverless computing method and apparatus according to an embodiment of the present invention can reduce the relocation time of an application through communication between network edges without using a central control device.

In addition, the serverless computing method and apparatus according to an embodiment of the present invention can compensate for insufficient resources of the network edge by operating a specific application only when there is a request.

DESCRIPTION OF DRAWINGS

These and/or other aspects will become apparent and more readily appreciated from the following description of the embodiments, taken in conjunction with the accompanying drawings in which.

DETAILED DESCRIPTION OF EMBODIMENTS

Figure 1:
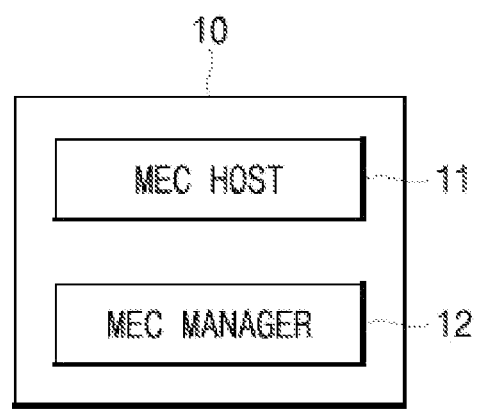
FIG. 1 is a block diagram of a conventional MEC system.
Figure 2:
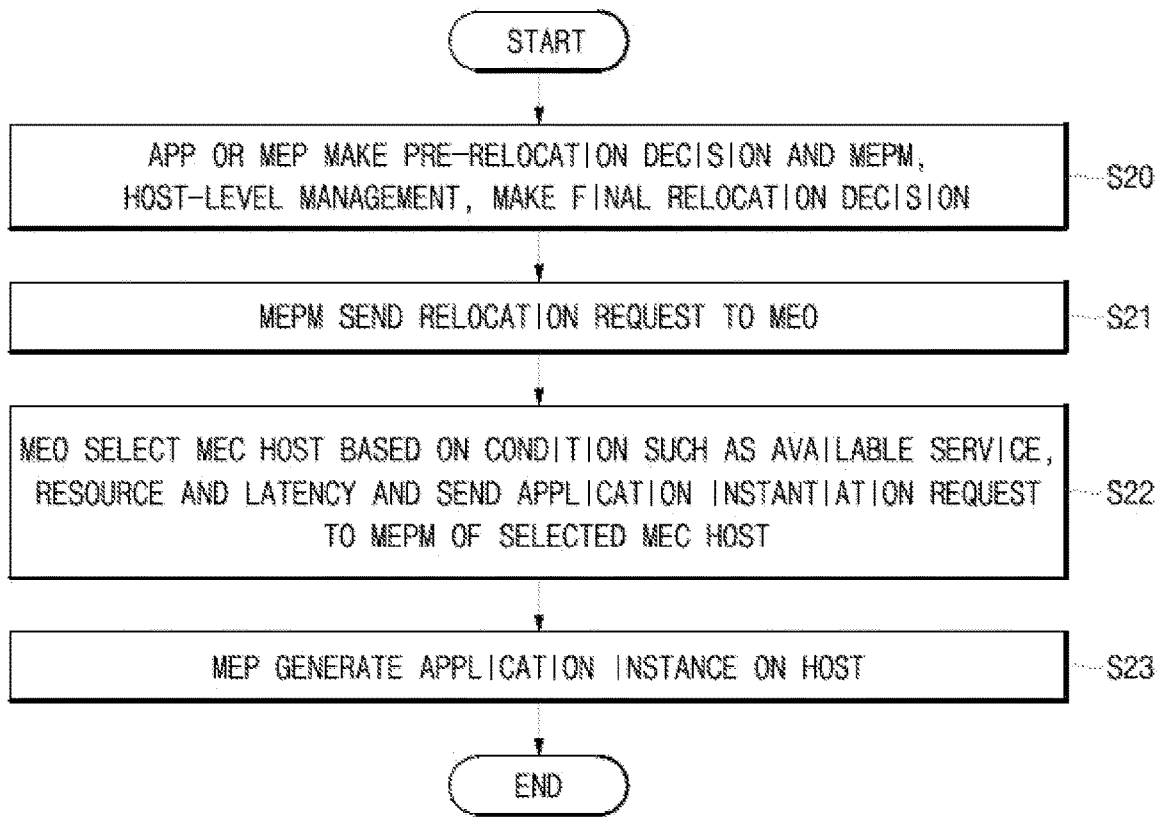
FIG. 2 is a flowchart illustrating an application relocation process of a conventional MEC system.

Since the present invention can have various changes and can have various embodiments, specific embodiments are illustrated in the drawings and described in detail in the detailed description. However, this is not intended to limit the present invention to specific embodiments, and should be understood to include all modifications, equivalents and substitutes included in the spirit and scope of the present invention. In describing each figure, like reference numerals have been used for like components.

Terms such as first, second, A, and B may be used to describe various components, but the components should not be limited by the terms. The above terms are used only for the purpose of distinguishing one component from another. For example, without departing from the scope of the present invention, a first component may be referred to as a second component, and similarly, a second component may also be referred to as a first component. The term and/or includes a combination of a plurality of related listed items or any of a plurality of related listed items.

When a component is referred to as being "connected" to another component, it may be directly connected to the other component, but it should be understood that other components may exist in between. On the other hand, when it is referred that a certain component is "directly connected" to another component, it should be understood that the other component does not exist in the middle.

The terms used in the present disclosure are only used to describe specific embodiments, and are not intended to limit the present invention. The singular expression includes the plural expression unless the context clearly dictates otherwise. In the present disclosure, terms such as "comprise" or "have" are intended to designate that a feature, number, step, operation, component, part, or combination thereof described in the present disclosure exists, and it should be understood that this does not preclude the possibility of the presence or addition of one or more other features numbers, steps, operations, components, parts, or combinations thereof.

Unless defined otherwise, all terms used herein, including technical or scientific terms, have the same meaning as commonly understood by one of ordinary skill in the art to which this invention belongs. Terms such as those defined in a commonly used dictionary should be interpreted as having a meaning consistent with the meaning in the context of the related art, and should not be interpreted in an ideal or excessively formal meaning unless explicitly defined in the present disclosure.

Hereinafter, preferred embodiments of the present invention will be described in detail with reference to the accompanying drawings.

Figure 3:
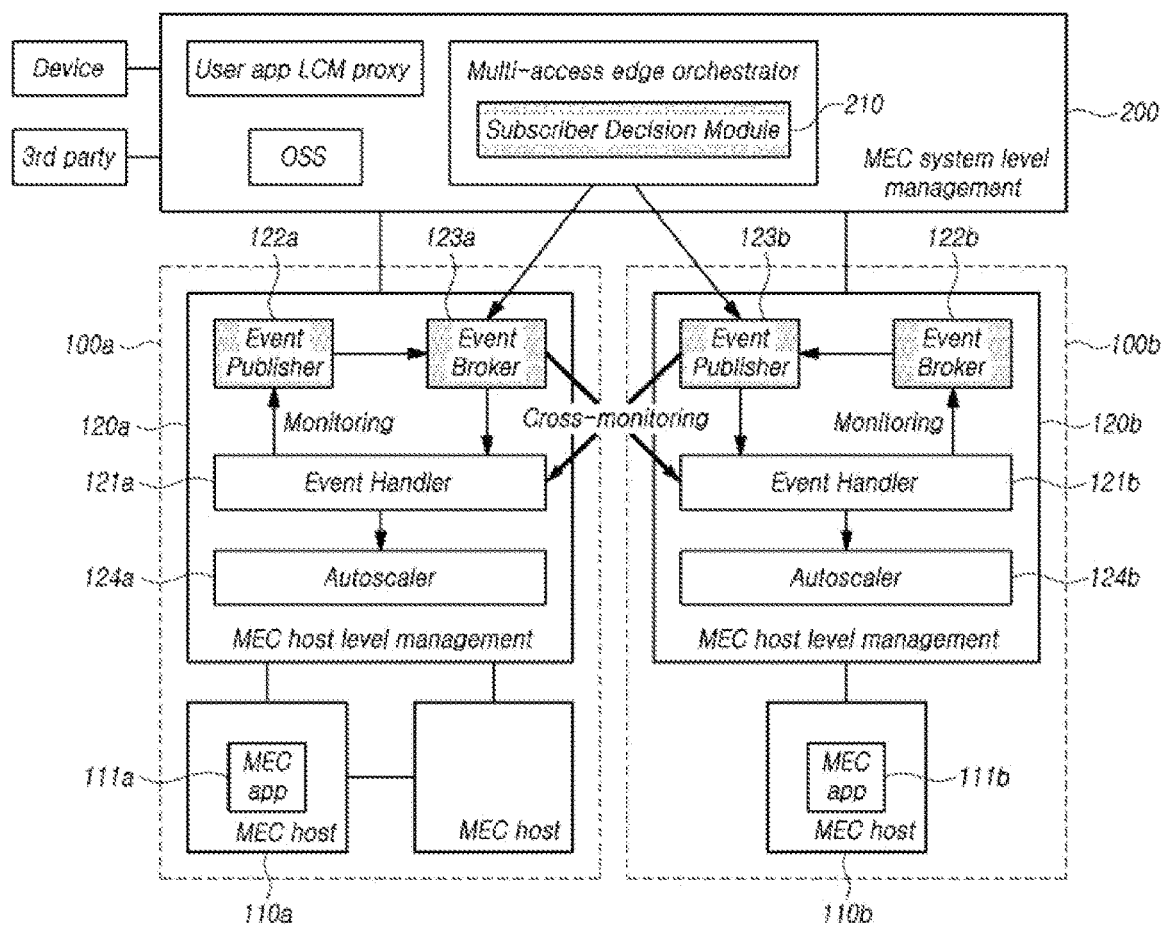
FIG. 3 is a configuration diagram of a serverless computing apparatus according to an embodiment of the present invention.
Figure 4:
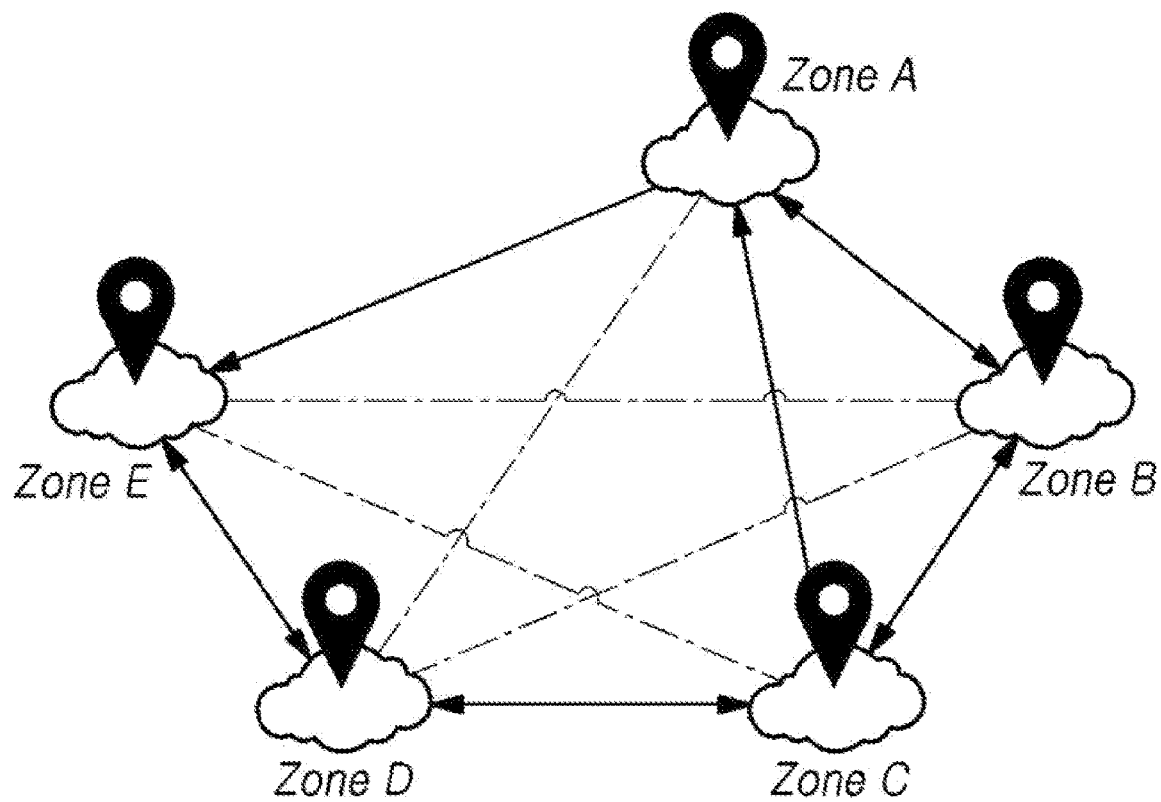
FIG. 4 is a diagram illustrating a grouped network edge in an embodiment of the present invention.
Figure 5:
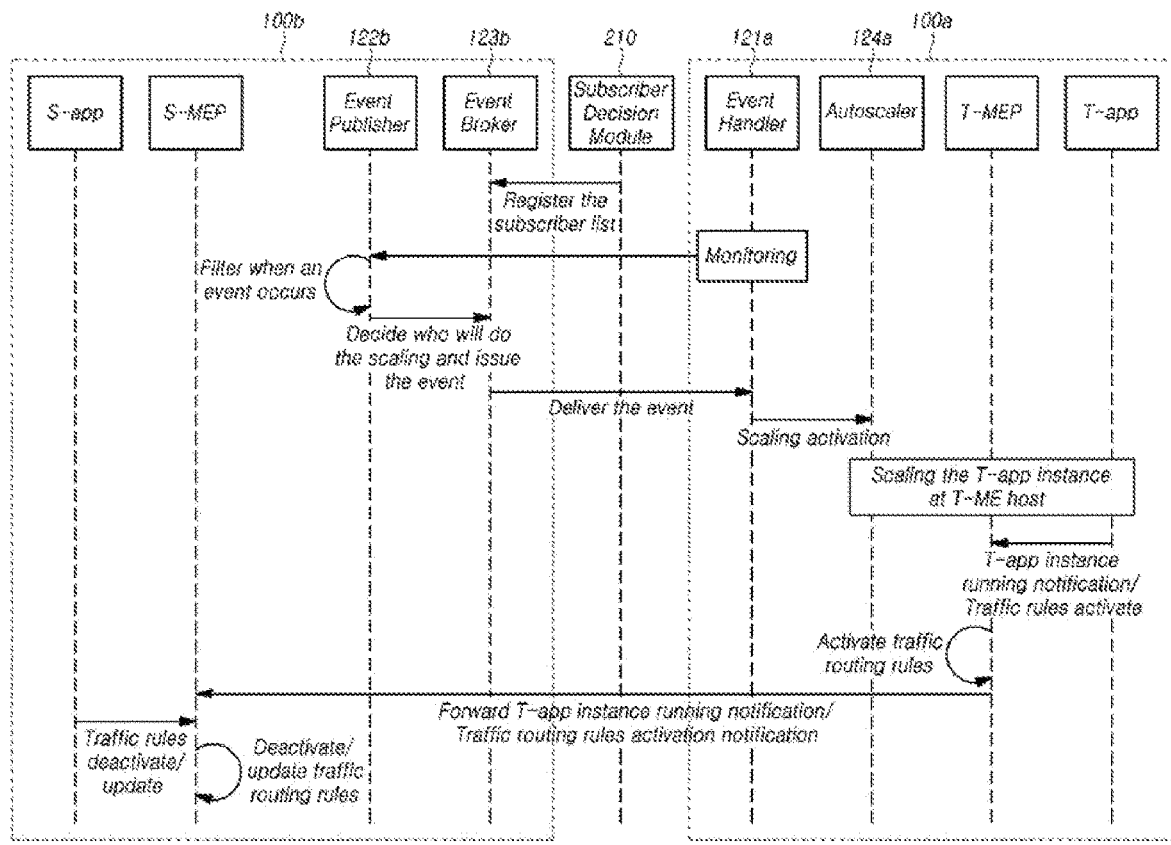
FIG. 5 is a diagram illustrating an operation flow of a serverless computing apparatus according to an embodiment of the present invention.
Figure 6:
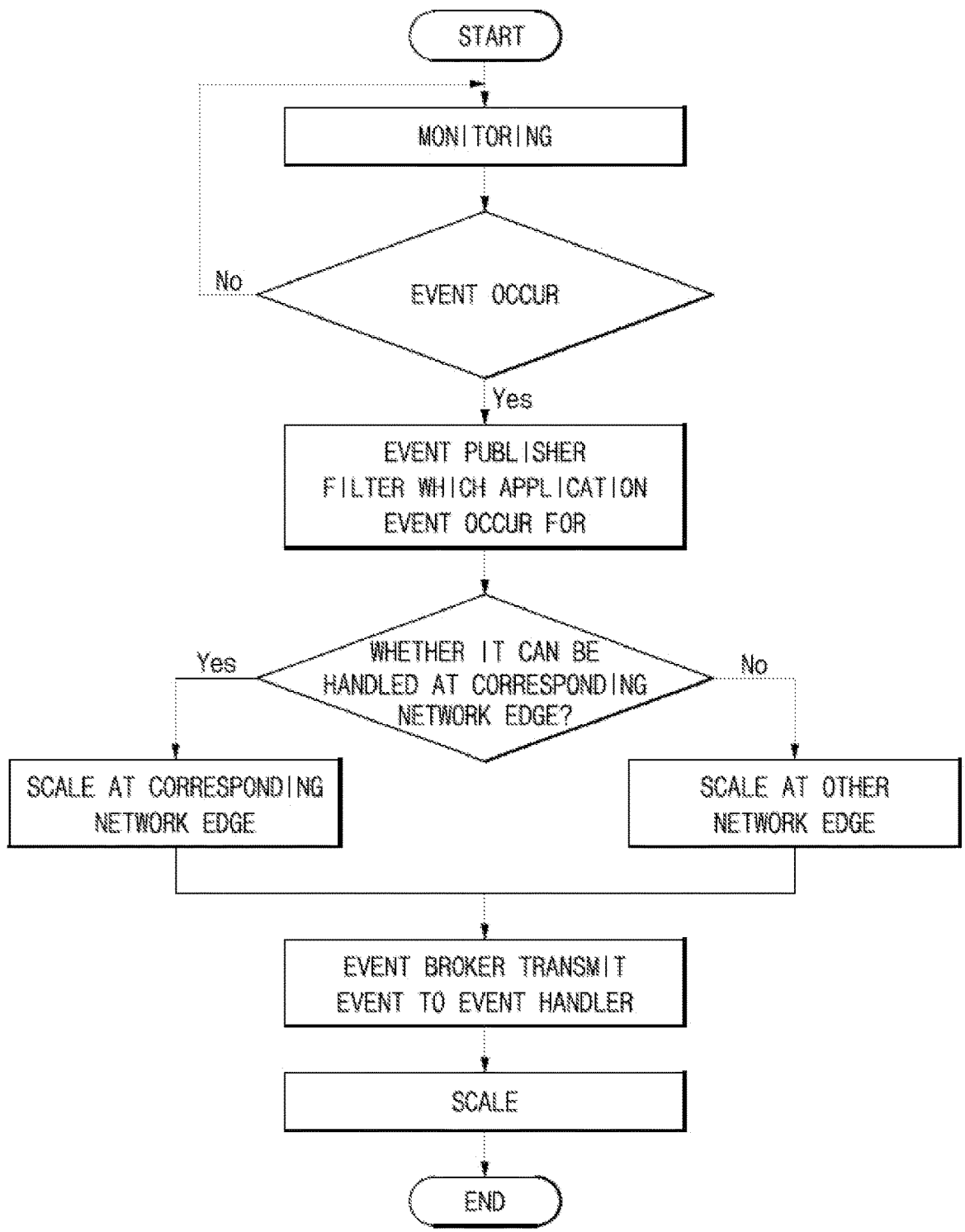
FIG. 6 is a flowchart of a serverless computing method according to an embodiment of the present invention.

FIG. 3 is a configuration diagram of a serverless computing apparatus according to an embodiment of the present invention, FIG. 4 is a diagram showing a grouped network edge in an embodiment of the present invention, FIG. 5 is a diagram illustrating an operation flow of a serverless computing apparatus according to an embodiment of the present invention, and FIG. 6 is a flowchart of a serverless 10) computing method according to an embodiment of the present invention.

Referring to FIG. 3, as a distributed cloud server, a first network edge 100a that is one of a plurality of network edges 100 communicates with a second network edge 100b that is a network edge adjacent to the first network edge 100a through serverless computing. In this case, the first network edge 100a and the second network edge 100b may be plural.

Each of the first network edge 100a and the second network edge 100b includes the MEC host 110 and the MEC host manager 120 therein. In other words, the first network edge 100a includes the MEC host 110a and the MEC host manager 120a therein, and the second network edge 100b includes the MEC host 110b and the MEC host manager 120b therein.

The MEC host 110 includes a virtual infrastructure (not shown) and an MEC platform (not shown) therein, and directly launches (scales) the application 111 using the MEC platform.

The MEC host manager 120 controls the operation of the MEC host 110 as a host-level manager, and one MEC host manager 120 may control a plurality of MEC hosts 110.

Each MEC host manager 120 includes an event handler 121, an event generating module (Event Publisher) 122, an event delivery module (Event Broker) 123, and an auto-scaler 124.

In other words, the first network edge 100a includes an event handler 121a, an event generating module 122a, an event delivery module 123a, and an auto-scaler 124a, and the second network edge 100b includes an event handler 121b, an event generating module 122b, an event delivery module 123b, and an auto-scaler 124b, respectively.

The event handler 121 monitors an event occurring in an adjacent network edge or receives a generated event response signal. In other words, the event handler 121a of the first network edge 100a monitors an event occurring in the second network edge 100b and transmits the monitoring result to the second network edge 100b. Thereafter, the event handler 121a receives the event response signal generated from the second network edge 100b. Here, the event may be an event according to the occurrence of a specific service execution request signal.

When an event occurs, the event generating module 122 generates an event response signal through filtering. Here, the event response signal may be a control signal for performing scaling for a specific application. In addition, the filtering refers to a process of determining which application the event occurs for, and through this filtering, the event generating module 122 determines to which first network edge 100a among the plurality of first network edges 100a the event response signal is transmitted.

For example, the event generating module 122 may determine the first network edge 100a having an application executing a specific service among the plurality of first network edges 100a as the first network edge 100a, to which a corresponding event response signal is transmitted.

In addition, when determining the network edge to which the event response signal is transmitted, whether there are insufficient resources and whether excessive traffic is generated at the network edge may be considered.

The event delivery module 123 transmits an event response signal to an adjacent network edge. In other words, the event delivery module 123b of the second network edge 100b transmits an event response signal to the event handler 121a of the first network edge 100a.

In an embodiment, the event delivery module 123 may transmit the event response signal only to the group of the second network edge 100b grouped by the subscriber decision module 210 to be described later. To this end, the event delivery module 123 may perform a pre-registration procedure by the subscriber decision module 210 before transmitting the event response signal.

The auto-scaler 124 scales the application based on the event response signal. Specifically, the auto-scaler 124 scales the application 111 of the MEC host 110 corresponding to the event response signal through the control command.

On the other hand, in one embodiment of the present disclosure, the serverless computing apparatus is a system-level manager and includes a central control device (Multi-access Edge Orchestrator (MEO)) 200 that controls the first network edge 100a and the second network edge 100b.

In addition, the central control device 200 may include a subscriber decision module 210, and the subscriber decision module 210 may group by deciding a subscriber for a part of the first network edge 100a according to a preset criterion.

Here, the subscriber is a group of the first network edges 100a grouped by the subscriber decision module 210, and the preset criterion may be, for example, n first network edges 100a closest to the second network edge 100b, or a first network edge excluding a specific first network edge among the first network edges 100a adjacent to the second network edge 100b.

In other words, as shown in FIG. 4, when the second network edge is Zone B in a plurality of network edges of Zone A, Zone B, Zone C, Zone D, and Zone E, the two network edges Zone A and Zone C closest to Zone B may be the first network edges. In this case, when there is no application launched when a specific event occurs in Zone A and there is an application launched when a specific event occurs in Zone C, only Zone C may be the first network edge.

As such, the subscriber decision module 210 groups the first network edge 100b through subscriber decision, thereby simplifying the number of first network edges 100b, to which transmitting an event response signal, and shortening the application relocation time.

Referring to FIG. 5, the subscriber decision module 210 transmits the subscriber list, which is the grouped first network edge 100a, to the event delivery module of the second network edge 100b in advance.

Thereafter, when the event handler 121a of the first network edge 100a transmits the monitoring result of the second network edge 100b according to the occurrence of the event to the event generating module 122b of the second network edge 100b, the event generating module (Event Publisher) of the second network edge generates an event response signal.

At this time, the event generating module 122b may determine to which first network edge 100a the event response signal is transmitted among the first network edges 100a included in the subscriber list through filtering before generating the event response signal.

When the event delivery module 123b transmits the event response signal to the event handler 121a of the first network edge 100a, the auto-scaler 124a scales the application in the first network edge 100a, so that the MEC host of the first network edge 100a can execute the requested service.

Meanwhile, referring to FIG. 6 in an embodiment of the present disclosure, before transmitting the event response signal, the event delivery module 123b may identify the resource of the second network edge 100b.

If the remaining resources of the second network edge 100b are less than a preset reference value, the event delivery module 123b may transmit an event response signal to the event handler 121a of the first network edge 100a.

On the other hand, if the remaining resources of the second network edge 100b are equal to or greater than the preset reference value, the event delivery module 123b may transmit an event response signal to the event handler 121*b* of the second network edge 100*b*.

In other words, if the remaining resources of the second network edge 100*b* are less than a preset reference value, the event delivery module 123*b* determines that the resource is insufficient at the corresponding network edge and transmits the event response signal so that the application is scaled at the first network edge 100*a*. However, if the remaining resources of the second network edge 100*b* are greater than or equal to a preset reference value, the event delivery module 123*b* determines that the resources are sufficient at the corresponding network edge, and scales the application at the second network edge 100*b* by itself so that the flexible application relocation is performed.

As such, the serverless computing apparatus of the present disclosure detects an event occurring at each network edge through mutual monitoring of the second network edge and the first network edge so that efficient application relocation can be performed using serverless computing without receiving an application relocation request through the central control unit.

In addition, the serverless computing apparatus of the present disclosure can more efficiently utilize scarce resources of the network edge by scaling an application corresponding to a specific event only when the specific event occurs, rather than running all services at all times.

As described above, the present invention has been described with reference to the illustrated drawings, but the present invention is not limited by the embodiments and drawings disclosed in the present disclosure. It is apparent that various modifications can be made by those skilled in the art within the scope of the technical spirit of the present invention. In addition, although the effects according to the configuration of the present invention are not explicitly described while describing the embodiments of the present invention, it is apparent that the effects predictable by the configuration should also be recognized.

The invention claimed is:

1. A serverless computing method between a first network edge and a second network edge adjacent to the first network edge, the method comprising:
    monitoring, by an event handler of the first network edge, an event occurring in the second network edge;
    generating, by an event-generating module of the second network edge, an event response signal through filtering on the event in response to the event occurring;
    transmitting, by an event delivery module of the second network edge, the event response signal to the event handler of the first network edge;
    scaling an application, by an auto-scaler, in the first network edge based on the event response signal; and
    before transmitting the event response signal, identifying a resource of the second network edge, and if a remaining resource of the second network edge is greater than or equal to a preset reference value, transmitting, by the event delivery module, the event response signal to an event handler of the second network edge,
    wherein, if the remaining resource of the second network edge is less than the preset reference value, the event delivery module transmits the event response signal to the event handler of the first network edge,
    wherein the second network edge detects an event occurring in each network edge through mutual monitoring with the first network edge.

2. The serverless computing method of claim 1 further comprises, before the monitoring, grouping, by a multi-access edge orchestrator (MEO) that is a central control device for controlling the first network edge and the second network edge, a part of the first network edge according to a preset criterion.

3. A serverless computing apparatus between a first network edge and a second network edge adjacent to the first network edge comprising: one or more processors for executing an instruction, wherein one or more processors perform steps comprising, monitoring, by an event handler of the first network edge, an event occurring in the second network edge;
    generating, by an event-generating module of the second network edge, an event response signal through filtering on the event in response to the event occurring;
    transmitting, by an event delivery module of the second network edge, the event response signal to the event handler of the first network edge;
    scaling an application, by an auto-scaler, in the first network edge based on the event response signal; and
    before transmitting the event response signal, identifying a resource of the second network edge, and if a remaining resource of the second network edge is greater than or equal to a preset reference value, transmitting, by the event delivery module, the event response signal to an event handler of the second network edge,
    wherein, if the remaining resource of the second network edge is less than the preset reference value, the event delivery module transmits the event response signal to the event handler of the first network edge,
    wherein the second network edge detects an event occurring in each network edge through mutual monitoring with the first network edge.

4. The serverless computing apparatus of claim 3, wherein one or more processors further perform, before the monitoring, a step of grouping, by a multi-access edge orchestrator (MEO) that is a central control device for controlling the first network edge and the second network edge, a part of the first network edge according to a preset criterion.

* * * * *